(12) United States Patent
Yang et al.

(10) Patent No.: US 9,196,079 B2
(45) Date of Patent: Nov. 24, 2015

(54) ACCELERATED COMPUTE TESSELLATION BY COMPACT TOPOLOGICAL DATA STRUCTURE

(71) Applicants: Jian Yang, Shanghai (CN); Huaibing Zhu, Shanghai (CN); Vineet Goel, Winter Park, FL (US); Yan Li, Shanghai (CN)

(72) Inventors: Jian Yang, Shanghai (CN); Huaibing Zhu, Shanghai (CN); Vineet Goel, Winter Park, FL (US); Yan Li, Shanghai (CN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 224 days.

(21) Appl. No.: 13/688,853

(22) Filed: Nov. 29, 2012

(65) Prior Publication Data
US 2013/0169636 A1  Jul. 4, 2013

Related U.S. Application Data

(60) Provisional application No. 61/581,879, filed on Dec. 30, 2011.

(51) Int. Cl.
*G06T 15/30* (2011.01)
*G06T 17/20* (2006.01)
*G06T 15/08* (2011.01)
*G06T 15/04* (2011.01)

(52) U.S. Cl.
CPC .............. *G06T 15/08* (2013.01); *G06T 15/04* (2013.01); *G06T 17/20* (2013.01); *G06T 17/205* (2013.01)

(58) Field of Classification Search
CPC ........ G06T 17/20; G06T 17/205; G06T 15/04
USPC ....................................................... 345/423
See application file for complete search history.

(56) References Cited

U.S. PATENT DOCUMENTS 8,120,607 B1 * 2/2012 Legakis et al. ................ 345/423

* cited by examiner

*Primary Examiner* — Stephen R Koziol
*Assistant Examiner* — Robert Craddock
(74) *Attorney, Agent, or Firm* — Volpe and Koenig, P.C.

(57) ABSTRACT

A system, method, and computer program product are provided for tessellation using shaders. New graphics pipeline stages implemented by shaders are introduced, including an inner ring shader, an outer edge shader, and topologic shader, which work together with a domain shader and geometry shader to provide tessellated points and primitives. A hull shader is modified to compute values used by the new shaders to perform tessellation algorithms. This approach provides parallelism and customizability to the presently static tessellation engine implementation.

21 Claims, 7 Drawing Sheets

ACCELERATED COMPUTE TESSELLATION BY COMPACT TOPOLOGICAL DATA STRUCTURE

CROSS-REFERENCE TO RELATED APPLICATIONS

The present application claims the benefit of U.S. Provisional Patent Application No. 61/581,879, filed Dec. 30, 2011, entitled "Accelerated Compute Tessellation by Compact Topological Data Structure", which is incorporated herein by reference in its entirety.

BACKGROUND OF INVENTION

1. Field of the Invention

The present invention relates generally to computer processing and, in particular, to tessellation techniques.

2. Description of the Background Art

As graphics processing computational power has dramatically increased in recent years, many software developers have taken advantage of these capabilities to develop photorealistic applications. These applications tax modern system resources to the limit, requiring significant memory space to buffer vertex information defining three-dimensional (3D) models and their texture data, as well as graphics processing unit (GPU) clock cycles for their manipulation.

Defining realistic 3D models using patch data (e.g., a collection of two-dimensional (2D) polygons, typically triangles) generally requires a large number of such patches. Such patches, in addition to graphics, are relevant to a number of other areas of computer processing. These may include, for example, finite element analysis and computational fluid dynamics. A complex model defined using polygons will typically be more accurately represented the more polygons, and their corresponding vertices, that are used.

For example, while a 3D artist can readily make a very realistic model using many vertices, actually rendering such a complex design can exhaust processing resources. This is acceptable in certain applications (e.g., 3D movie development) where rendering time is sacrificed for the benefit of realism. However, this tradeoff is unacceptable in other applications, such as real-time rendering (e.g., video games).

Having a large number of vertices makes real-time manipulation of a model very challenging. Vertex shaders, which perform operations on a per-vertex basis (e.g., application of a transform matrix), quickly become a computational bottleneck with too many vertices to operate on.

Tessellation is a technique by which a simple model with fewer polygons (e.g., triangles, points, lines) is reconstituted using a larger set of objects that are each smaller in size. For example, for a triangle having three vertices, a new vertex in the center of the triangle can be introduced. Then, new edges connecting the existing vertices can be added to create three new triangles. These new objects can then be manipulated to add detail that could not have been rendered by the previous smaller set of objects.

With the introduction of Direct3D® 11 by Microsoft® Corporation of Redmond, Wash., tessellation became a standard function of the render pipeline. Tessellation is implemented using three new stages: a hull shader stage, a tessellation stage, and a domain shader stage.

The hull shader stage produces a geometry patch for each input patch (e.g., a quad, triangle, or line). The tessellator stage uses the geometry patch to create smaller polygons (e.g., triangles, points, lines) that are interconnected within the geometry patch. The domain shader stage then calculates vertex positions (i.e., absolute positions) for each newly-generated vertex. Polygons (which include both lines and points) are also frequently referred to as primitives and the terms will be used interchangeably herein.

While this concept allows software developers to create simpler, less computationally-intensive models that nevertheless result in realistic visualizations, several challenges remain. Although the hull shader and domain shader stages are programmable in existing designs, the tessellation stage is fixed in hardware. Moreover, the tessellation techniques applied by the fixed tessellation stage are highly serial in operation, requiring multiple processor clock cycles for the tessellation of each input patch (typically one clock cycle per new object created).

Accordingly, what is desired is a replacement tessellation stage that is flexible and more efficient.

SUMMARY OF EMBODIMENTS OF THE INVENTION

Embodiments of the invention, under certain circumstances, include a method comprising processing a patch, by a computing device, to identify an inner ring, an outer edge, and a stitch of the patch, computing point data using the inner ring and the outer edge, computing primitive data using the stitch, and combining the primitive data and point data to produce tessellated primitives of the patch.

Embodiments of the invention additionally include a computer-readable storage device having instructions stored thereon, execution of which, by a computing device, causes the computing device to perform operations comprising processing a patch to identify an inner ring, an outer edge, and a stitch of the patch, computing point data using the inner ring and the outer edge, computing primitive data using the stitch, and combining the primitive data and point data to produce tessellated primitives of the patch.

Embodiments of the invention farther include a system comprising a hull shader configured to process a patch to identify an inner ring, an outer edge, and a stitch of the patch, one or more edge or ring shaders configured to compute point data using the inner ring and the outer edge, a topologic shader configured to compute primitive data using the stitch, and one or more domain or geometry shaders configured to combine the primitive data and point data to produce tessellated primitives of the patch.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein. Additionally, and as will be apparent to one of ordinary skill in the art, the simulation, synthesis and/or manufacture of the various embodiments of this invention may be accomplished, in part, through the use of computer readable code (as noted above), including general programming languages (such as C or C++), hardware description languages (HDL) including Verilog HDL, VHDL, Altera HDL (AHDL) and so on, or other available programming and/or schematic capture tools (such as circuit capture tools). This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

Reference to modules in this specification and the claims means any combination of hardware or software components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

Figure 1:
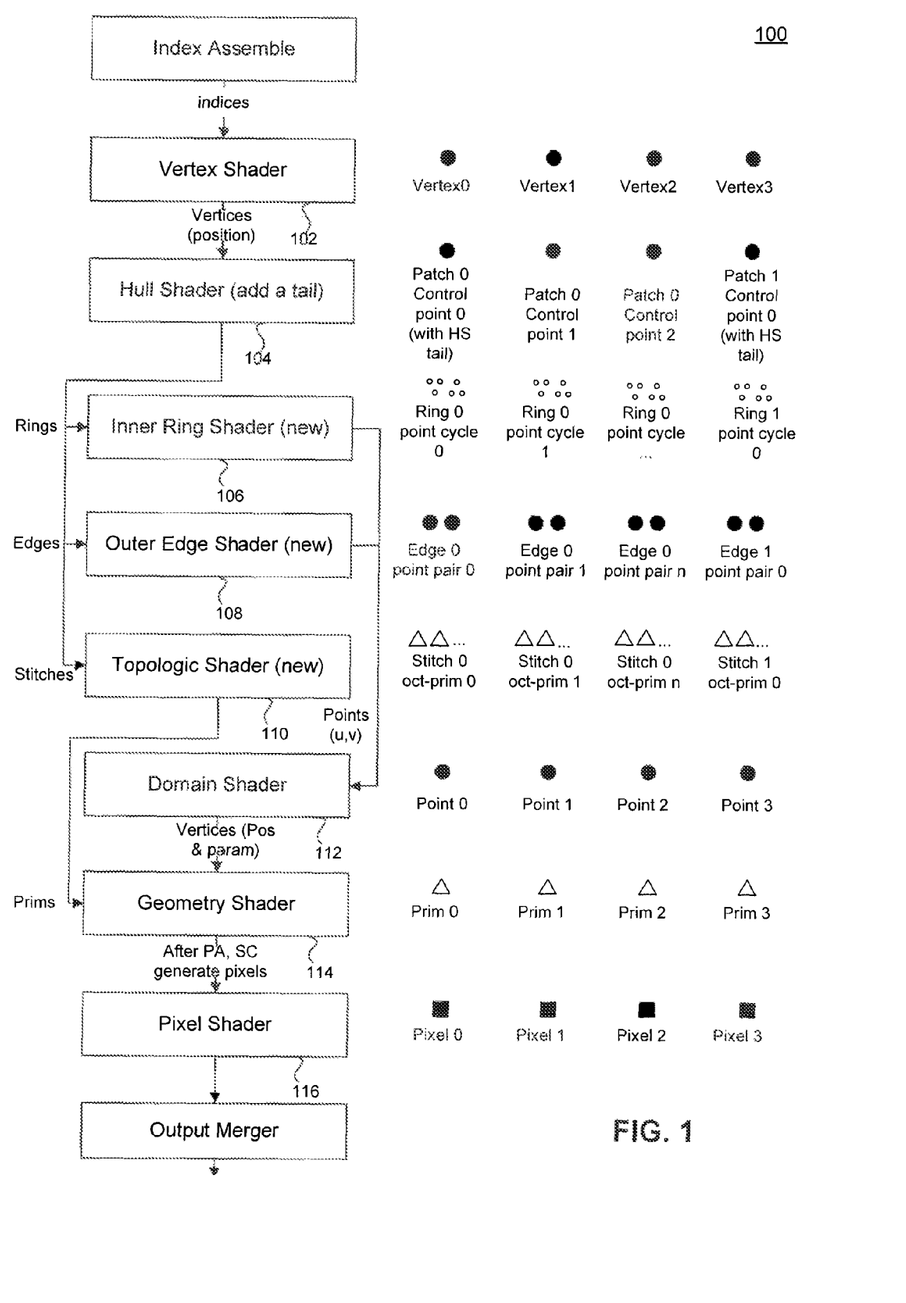
FIG. 1 is a graphics render pipeline 100, in accordance with an embodiment of the present invention.

FIG. 1 is a graphics render pipeline 100, in accordance with an embodiment of the present invention. Pipeline 100 includes a vertex shader 102, a hull shader 104, an inner ring shader 106, an outer edge shader 108, a topologic shader 110, a domain shader 112, a geometry shader 114, and a pixel shader 116. One skilled in the relevant arts will appreciate that other combinations of the shader functionality shown in FIG. 1 are contemplated within the scope of the present invention. Moreover, individual shader stages are generally optional, and their execution can be bypassed in an exemplary embodiment.

Each shader in pipeline 100 comprises computer program logic that performs a set of operations for graphics rendering on graphics hardware. Shaders are typically compact programs with a particular goal in mind (e.g., vertex manipulation, geometry manipulation, pixel manipulation, etc.). For example, vertex shader 102 would typically be configured to run once per vertex in a 3D model, applying effects such as transformations to change the location of the vertex, or per-vertex lighting.

Geometry shader 114 on the other hand can operate on an entire set of vertices that define a primitive, and therefore runs once per primitive. In some embodiments, geometry shader 114 can be utilized to perform tessellation in conjunction with a tessellation engine. Such an exemplary approach is described in U.S. patent application Ser. No. 12/472,709 to GOEL, entitled "SYSTEM, METHOD, AND COMPUTER PROGRAM PRODUCT FOR A TESSELLATION ENGINE USING A GEOMETRY SHADER", filed May 27, 2009, which is incorporated by reference in its entirety herein. Other functionality often found in geometry shader 114 includes fur/fin generation (simulating parallactic effects of fur or generating extruded edges) and shadow volume generation.

Pixel shader 116 similarly operates on a per-pixel basis. A pixel shader 116 would typically be configured to apply effects such as interpolation and anisotropic filtering. It can also apply color or brightness effects.

Vertex shaders and pixel shaders, and more recently geometry shaders, are in common use in high end 3D graphics applications. These shader stages are available in Microsoft® Direct3D 10, and allow for basic tessellation functionality via geometry shader 114.

With the introduction of Microsoft® Direct3D 11, three new pipeline stages that work together to implement tessellation were made available. Two of these three stages are shader stages, specifically the hull shader 104 and domain shader 112. Between these shader stages is a tessellator stage, with fixed tessellation behavior. The tessellator stage is not implemented in a shader in the Microsoft® Direct3D 11 specification, but is rather a fixed implementation.

The hull shader 104 operates on a per-control point basis, in accordance with an embodiment of the present invention. Control points that define a low-order surface (e.g., a triangle) are accepted as an input, and the hull shader 104 provides a new set of control points that define a patch. There is a separate portion of hull shader 104 that operates on a per-patch basis to generate per-patch constants used for tessellation (e.g., edge tessellation factors).

The tessellator stage is a fixed-function stage that performs actual subdivision of a patch provided by hull shader 104 into smaller primitives (e.g., triangles, points, lines). It operates once per patch, and provides a new set of points to the domain shader 112. Domain shader 112 operates on a per-point basis (output points from the tessellator stage) to obtain vertex positions for the points.

The tessellator stage described above takes a patch provided by the hull shader 104 and creates a new set of points. These new points are determined based on a fixed algorithm hard-coded into the tessellator stage, adjusted based on some parameters (e.g., tessellation factor).

For example, the tessellator stage may take an input patch that is a triangle (three vertices), and subdivide this patch into four new triangles. To do this, the tessellator stage would receive the three input control points defining the triangle, along with information about the new points to be created (i.e., references for three new points). The tessellator stage then calculates values for the new points (e.g., (u,v) coordinate values relative to the patch) in order to subdivide the patch, according to some fixed algorithm. The domain shader 112 can use this information to convert the newly-created points into vertices, thereby increasing the complexity of the original 3D model.

While this approach does accelerate tessellation compared to certain prior approaches, it is limited in its flexibility. In particular, the hard-coded tessellator stage cannot accommodate different tessellation approaches, as it is not necessarily desirable to tessellate all patches the same way. Additionally, because the tessellator stage operates on a per-patch basis, it is not possible to exercise the benefits of parallel operations, such as through the use of parallel shaders. In order to improve the computation time of the tessellator stage, it would therefore be necessary to increase the clock frequency, leading to increased power consumption and other undesirable consequences.

Rather than using the fixed-function, serial tessellator stage, inner ring shader 106, outer edge shader 108, and topologic shader 110 are introduced, in accordance with an embodiment of the present invention. Additionally, the hull shader 104 code is modified to add a "tail", or additional code that executes subsequent to the traditional hull shader 104 operations. As previously noted, the shader code in shaders 106, 108, 110 (as well as other shaders) can be located in multiple shaders, a single shader, or in various other combinations. These variants are contemplated within the scope of this disclosure, and those discussed herein are provided by way of example, and not limitation.

Figure 2:
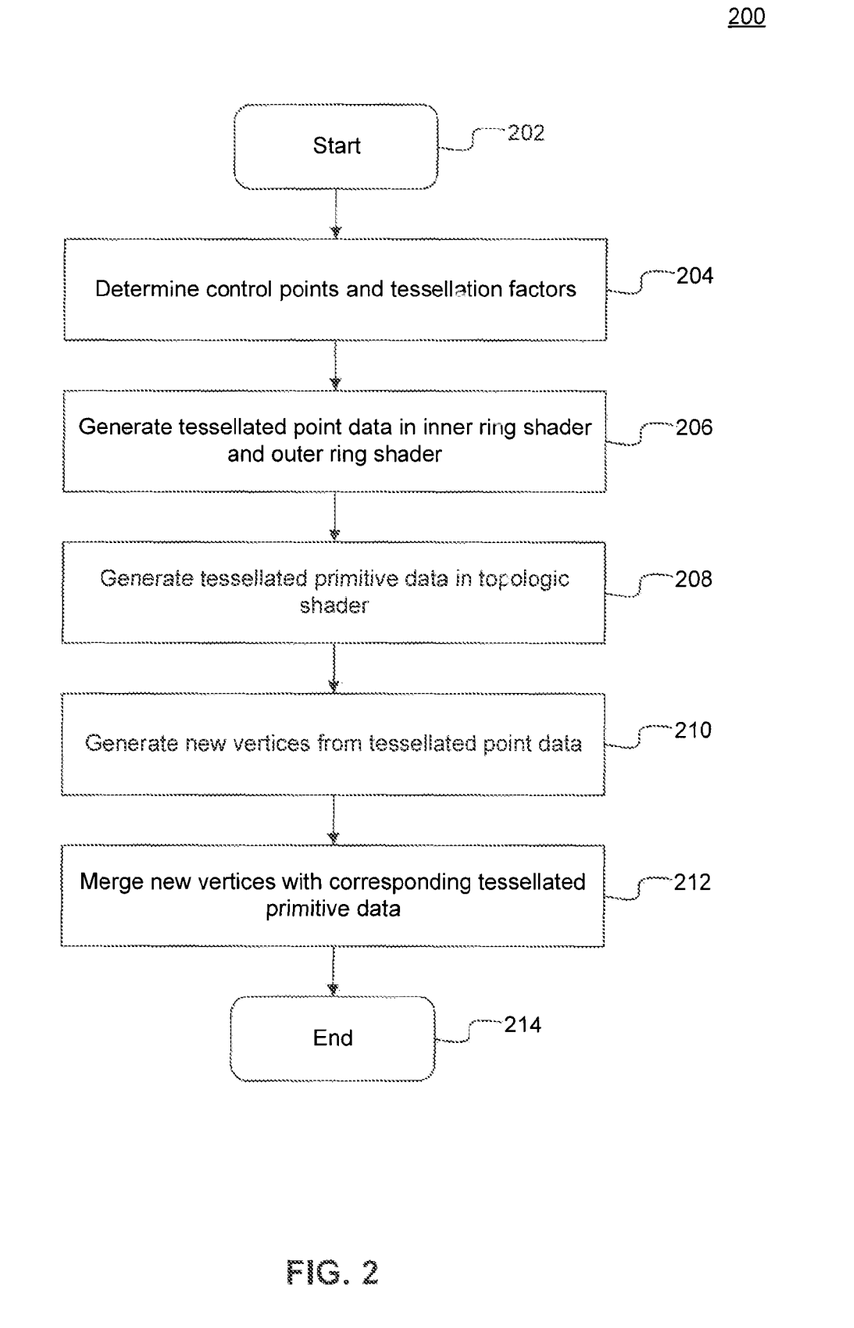
FIG. 2 is a flowchart illustrating steps by which tessellation is accomplished using novel shader operations, in accordance with an embodiment of the present invention.

FIG. 2 is a flowchart 200 illustrating steps by which tessellation is accomplished using the novel shader operations, in accordance with an embodiment of the present invention. The method begins at operation 202 and proceeds to operation 204 where control points and tessellation factors are determined. In accordance with an embodiment of the present invention, this functionality is handled in the hull shader 104, and corresponds to the "tail" code added to the traditional hull shader functionality.

The method then proceeds to operation 206 where tessellated point data is generated in the inner ring shader 106 and outer edge shader 108, in accordance with an embodiment of the present invention. The operations of these shaders will be described in further detail below. One of ordinary skill in the relevant art will appreciate that the operation of inner ring shader 106 and outer edge shader 108 as shown in operation 206 can be accomplished within a single shader, although a degree of parallelism is obtained by separating the operations into the two separate shaders.

At operation 208, tessellated primitive data is generated in topologic shader 110, in accordance with an embodiment of the present invention. As be described in further detail below, topologic shader 110 extracts primitives from a "stitch", or a portion of the input patch. One skilled in the relevant arts will appreciate that operation of the topologic shader 110 can also occur in parallel with the operations of the inner ring shader 106 and outer edge shader 108, although it is not necessary to do so.

The method proceeds to operation 210, where new vertices are generated from tessellated point data, in accordance with an embodiment of the present invention. As shown in FIG. 1, point information computed by inner ring shader 106 and outer edge shader 108 is provided to domain shader 112. Domain shader 112 translates these points (with (u,v) coordinates relative to the patch) into vertices with world coordinates ((x,y) coordinates that are on a same coordinate system as other vertices of the 3D model).

At operation 212, the new vertices computed by domain shader 112 are combined with the primitive information from topologic shader 110, in accordance with an embodiment of the present invention. As shown in FIG. 1, this process is handled by geometry shader 114, which takes vertex information and primitive information and combines the two to provide a new set of primitives that have their complete associated vertex information. The method then ends at operation 214.

The tessellation process described in flowchart 200 is transparent to the domain shader 112 and, in particular, to geometry shader 114. Geometry shader 114 operates in the same manner whether or not tessellation is performed, except in the case of tessellation it is provided with an additional set of vertices and primitives that were created by the tessellation approach. Domain shader 112 is able to operate in the same manner as with the existing tessellation engine, operating on the new set of points created by the tessellation process of flowchart 200.

Figure 3:
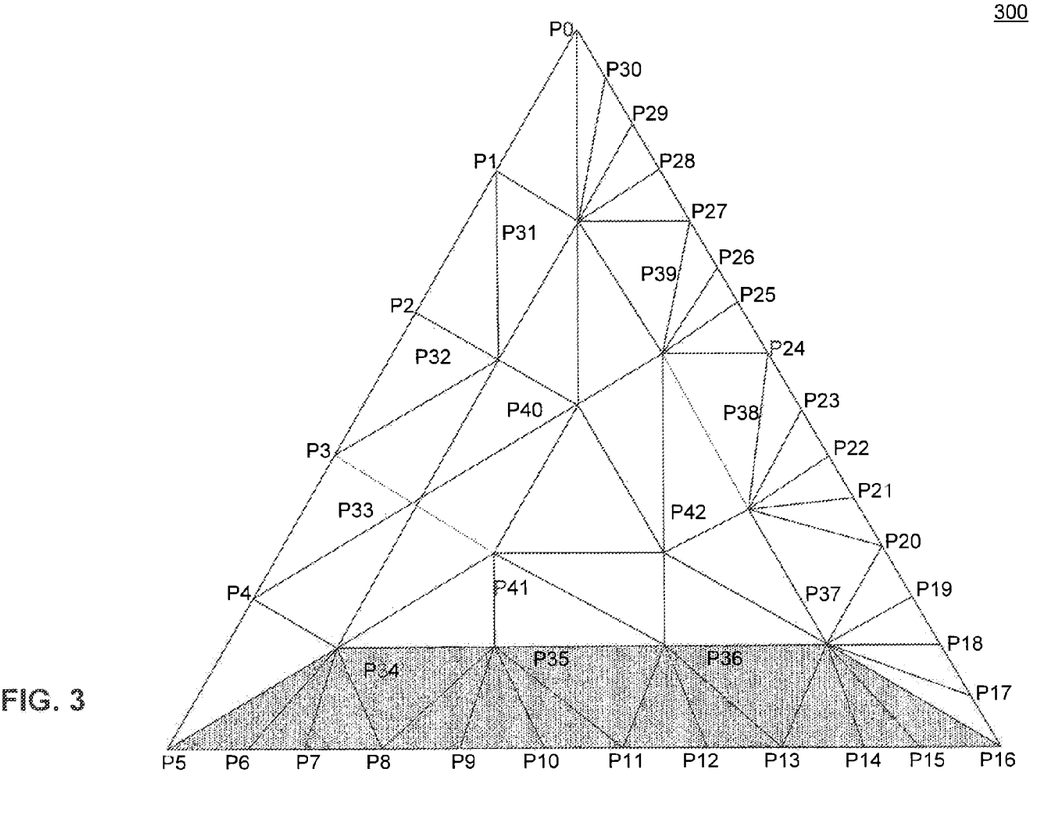
FIG. 3 illustrates a tessellated triangle patch, in accordance with an embodiment of the present invention.

FIG. 3 illustrates a tessellated triangle patch 300, in accordance with an embodiment of the present invention. One skilled in the relevant arts will recognize that the precise tessellation technique shown in FIG. 3 is illustrative, and that the use of shaders for the purpose of tessellation permits flexibility in the tessellation approach.

In triangle patch 300, the patch is described in the triangle domain using three vertices (P0, P5, P16). The vertices of this patch, which are provided as an input to hull shader 104, serve as the control points (control points 0, 1, and 2).

At this point, the basic triangle patch that will be further tessellated is completely defined. However, in order to understand the information that is used by the various shaders introduced herein, additional terminology is needed.

The "outer edge", which is the focus of computations by the outer edge shader 108, is the outer edge of the original triangle. In FIG. 3, the edges (P0, P5), (P5, P16), and (P16, P0) are all outer edges.

The "inner ring", which is the focus of computations by the inner ring shader 106, is an inner triangle created during the tessellation process. Depending on tessellation factors, multiple inner rings may be created. In FIG. 3, the triangles defined by (P31, P34, P37) and (P40, P41, P42) are both inner rings.

A "stitch", which is the focus of computations by the topologic shader 110, is a trapezia domain shape bound by an outer edge (not necessarily the outer edge of the original triangle, but also outer edges defined by inner rings) and its opposite inner edge. In FIG. 3, the shaded area defined by points (P5, P16, P37, P34) is a stitch. Additionally, the area defined by points (P34, P37, P42, P41) is also a stitch.

Computationally, a stitch can be defined by an index of the outer edge (e.g., P5), the number of points over the outer edge (e.g., 12), an index of the inner edge (e.g., P37), and the number of points in the inner edge (e.g., 4). The "tail" portion of the hull shader 104 is modified, in accordance with an embodiment of the present invention, to compute stitches based on the number of points on each edge. The number of triangles in the stitch is given by (M+N−2), where M is the number of points on the outer edge, and N is the number of points on the inner edge. In the above example, the stitch (P5, P16, P37, P34) contains (12+4−2)=14 triangles.

The hull shader 104 "tail" portion also computes post proceeding tessellation factors according to a tessellation setting, in accordance with an embodiment of the present invention. The hull shader 104 also computes all of the initial information needed by shaders 106, 108, and 110, including the total number of points, total number of triangles, total number of inner rings, and total number of stitches in the patch, in accordance with an embodiment of the present invention. Hull shader 104 also computes the total number of outer edges, although this result will always be '3' if the patch is in the triangle domain.

Hull shader 104 also computes an index of the first outer edge, inner ring, and stitch in an outer edge buffer, inner ring buffer, and stitch buffer. A base index of each outer edge (for point data), each inner ring (also for point data), and each stitch (for primitive data) is also computed. The hull shader 104 then provides outer edges, inner rings, and stitches to corresponding buffers from which shaders 106, 108, and 110 read.

An exemplary non-limiting operation of hull shader 104, depicting its inputs, computed values, and output data provided to shaders 106, 108, and 110 is provided below:

Thread 0 (patch (P0, P5, P16), control point P0)
Input:
outer factors: 4.93, 10.42, 14.88,
scale factor: 1.0
reduction: min
partition: odd
Computed Values:
inner factor: 4.93
number of inner rings: 2
num_segments[4]: {5, 11, 15, 3}
total_number_points: 5+11+15+3*2*2=43
total_number_prims: 3+3*2*(2−1)+1=10
parity: odd, odd, odd, odd
Output Data:
stitch: {P0P5P34P31, P5P16P37P34, P16P0P31P37, P31P34P41P40, P34P37P42P41, P37P31P40P42, P40P41P42−}
outer edge: {P0P5, P5P16, P16P0}
inner ring: {P31P34P37, P40P41P42}

The hull shader 104 code that is traditionally provided for tessellation operates on each control point (e.g., P0, P5, and P16 in the above example). However, the "tail" code use to compute the output data provided to shaders 106, 108, and 110 only needs to be executed once on the first control point (in this example, control point P0 as shown above).

In accordance with an embodiment of the present invention, the output data (stitch, outer edge, and inner ring) is provided in patch order. For example, the stitch buffer used to provide data to topologic shader 110 is populated by hull shader 104 in the order P0S0, P0S1, . . . , P0Sn, P1S0, P1S1, etc., where P0S0 means stitch 0 of patch 0.

As reflected in the aforementioned example, each stitch item comprises the number of points on the outer edge (M), the number of points on the inner edge (N), the first index of the outer edge, the first index of the inner edge, and a base address for output triangles, in accordance with an embodiment of the present invention.

In accordance with a further embodiment of the present invention, the outer edge output comprises a point pair number of the edge, the first index of the edge, and a base address for the output point. In accordance with an additional embodiment of the present invention, each outer edge output comprises a point number per edge, the first index of the ring, and a base address for the output point.

In the aforementioned examples, references to a base address for an output point or output triangles are references to a point buffer and primitive buffer, which are ultimately provided to domain shader 112 and geometry shader 114. These buffers are modified to include new points and primitives generated by shaders 106, 108, and 110, and are provided in patch order.

Using the aforementioned stitch data, topologic shader 110 can be used to compute primitive data to populate the primitive buffer. In accordance with an embodiment of the present invention, work load is balanced among topologic shader 110 threads by assigning a number of primitives to a thread (e.g., 8 primitives per thread).

In the case of stitch (P5, P16, P37, P34) of FIG. 3, two primitive packages are needed to handle the 14 resulting triangles (e.g., 8 triangles/primitives in the first package, 6 triangles/primitives in the second package). Primitive packages are provided to the topological shader routine in patch, stitch, and primitive order (e.g., P0S0p0, P0S0p1, P0S1p0, etc.). In an exemplary embodiment, 64 threads of topologic shader 110 are executed as a wave, demonstrating the parallel processing ability of this routine.

Continuing the earlier example, a shader wave including the highlighted stitch in FIG. 3 (identified as "stitch 1" here) would have the following non-limiting operation:

Stitch Buffer:
Stitch 0: P0 P31 (6,4) base: 0 patchID 0
Stitch 1: P5 P34 (12,4) base: 8 patchID 0
Stitch 2: P16 P37 (16,4) base: 22 patchID 0
Stitch 3: P31 P40 (4, 2) base: 40 patchID 0
Stitch 4: P34 P41 (4, 2) base: 44 patchID 0
Stitch 5: P37 P42 (4, 2) base: 48 patchID 0
Stitch 6: P40 P42 (2, 1) base: 52 patchID 0
. . .
Top Shader Wave:
Thread 0: stitch 0, primitive 0, output: P0, P1, P31
. . .
Thread 8: stitch 1, primitive 8, output: P5, P6, P34
Thread 9: stitch 1, primitive 9, output: P6, P7, P34
Thread 10: stitch 1, primitive 10, output: P7, P8, P34
Thread 11: stitch 1, primitive 11, output: P8, P35, P34
Thread 12: stitch 1, primitive 12, output: P8, P9, P35
Thread 13: stitch 1, primitive 13, output: P9, P10, P35
Thread 14: stitch 1, primitive 14, output: P10, P11, P35
. . .

As is evident from the above operation, the topologic shader 110 is provided with the necessary information for stitch 1: P5 P34 (12,4), base 8, and patchID 0. This indicates that the first index for the outer edge is P5, the first index for the inner edge is P34, there are 12 points in the outer edge, and there are 4 points in the inner edge. The base primitive value is 8, which indicates that the prior stitches (stitch 0 here) produced 8 primitives (primitives 0-7), and this stitch begins with primitive 8. Additionally, stitch 1 is part of patch 0.

Figure 4:
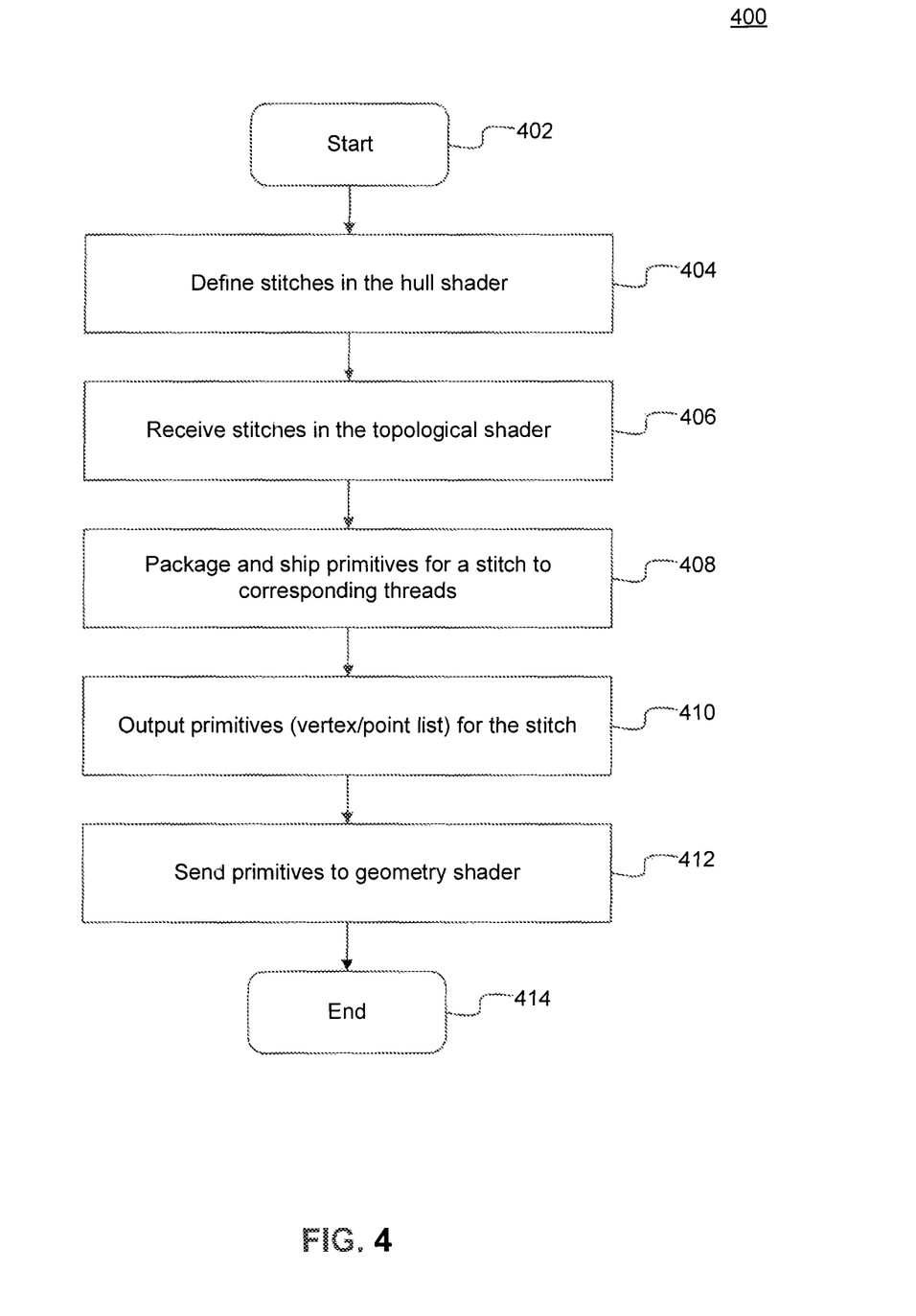
FIG. 4 is a flowchart illustrating steps by which topologic shader provides a primitive output, in accordance with an embodiment of the present invention.

The output shown in the bottom part of the above operation shows that each of the primitives created from stitch 1 (only some are shown) are computed and associated with their corresponding points. FIG. 4 is a flowchart 400 illustrating operations by which topologic shader 110 provides the primitive output, in accordance with an embodiment of the present invention. The method begins at operation 402 and proceeds to operation 404 where stitches are defined in the hull shader 104, in accordance with an embodiment of the present invention. These stitches are received in the toplogical shader 406, and packaged into primitive packages at operation 408 for load balancing across threads, in accordance with an embodiment of the present invention.

At operation 410, each thread outputs its corresponding primitives for the stitch to the primitive buffer, where they are sent to geometry shader 114 at operation 412. The method then ends at operation 414.

Although one skilled in the relevant arts will appreciate that the precise algorithm applied by the topologic shader will depend on the desired tessellation effect, an exemplary algorithm is provided here. Since the topologic shader is, in fact, implemented in a shader unit, it can be customized by a software developer, providing significantly more flexibility than the statically-defined tessellation engine used previously.

The exemplary algorithm is again discussed in the context of highlighted stitch (P5, P16, P37, P34) of FIG. 3. With M=12 (outer edge points) and N=4 (inner edge points) given, the topology of the stitch is then determined. In this example, given an order K, the vertices index of the $K^{th}$ primitive of the stitch can be determined, where K<(M+N−2). As noted above, (M+N−2) defines the total number of primitives in the stitch using this exemplary algorithm, which is 12+4−2=14 in this case. As a result, primitives K are numbered 0 to 11.

In order to determine the $K^{th}$ primitive of the stitch, a couple of computations are used. While this can be readily accomplished in series, note that the exemplary approach is to compute each $K^{th}$ primitive in parallel, which requires a few redundant computations. Since each primitive is computed based on (M, N, K), there is a maximum tessellation factor of 64, so $1 \le M \le 64$, $1 \le N \le 64$, $0 \le K \le 126$ in this example, with indices counting from 0.

However, with each index represented by an 8-bit integer (7 bits for index and 1 bit for inner/outer flag), each unit is a 24-bit integer. With a texture of 64*64*126*24-bits, the data is too large for efficient handling by parallel threads operating on each primitive. This is resolved by combining 8 primitives into a primitive package, as discussed above, to save on texture size and total number of threads, in accordance with an embodiment of the present invention. However, one of ordinary skill in the art will recognize that packaging primitives in this manner is not required, and can either be omitted entirely or packaged in a different manner while remaining within the scope of this disclosure.

The value of K is additionally instead associated with the $K^{th}$ primitive of the patch, allowing it to serve as an index into the primitive buffer.

As previously described, each stitch item comprises the number of points on the outer edge (M), the number of points on the inner edge (N), the first index of the outer edge (A), the first index of the inner edge (B), and a base address (K) for output triangles, in accordance with an embodiment of the present invention.

Turning to the first primitive (primitive 8, defined by (P5, P6, P34)) in FIG. 2, it is first determined whether the triangle is upwards or downwards. In the case of FIG. 2, this triangle is upwards, meaning it has two points on the outer edge—P5 and P6. In this case, the first point is given by A (P5), the second point is given by B (P34), and the third point of this triangle is given by A+1 (P6). The index for the next primitive becomes (A+1, B), and the process continues in similar manner—the next iteration starts with points A+1 (P6) and B (P34) and, because two points are on the outer edge, the next point is given by A+2 (P7). If there are two points on the inner edge, the inner edge index B is incremented instead.

The first index is less than 64, so 5 bits are used to store the outer edge first index for a unit, and 8 bits to store the triangle directions. Also, another 3 bits are used to illustrate the unit contains 1-8 valid triangles. So the final unit size is 16 bits, and the texture size is 64*64*(128/8)*2=128k bytes.

Figure 5:
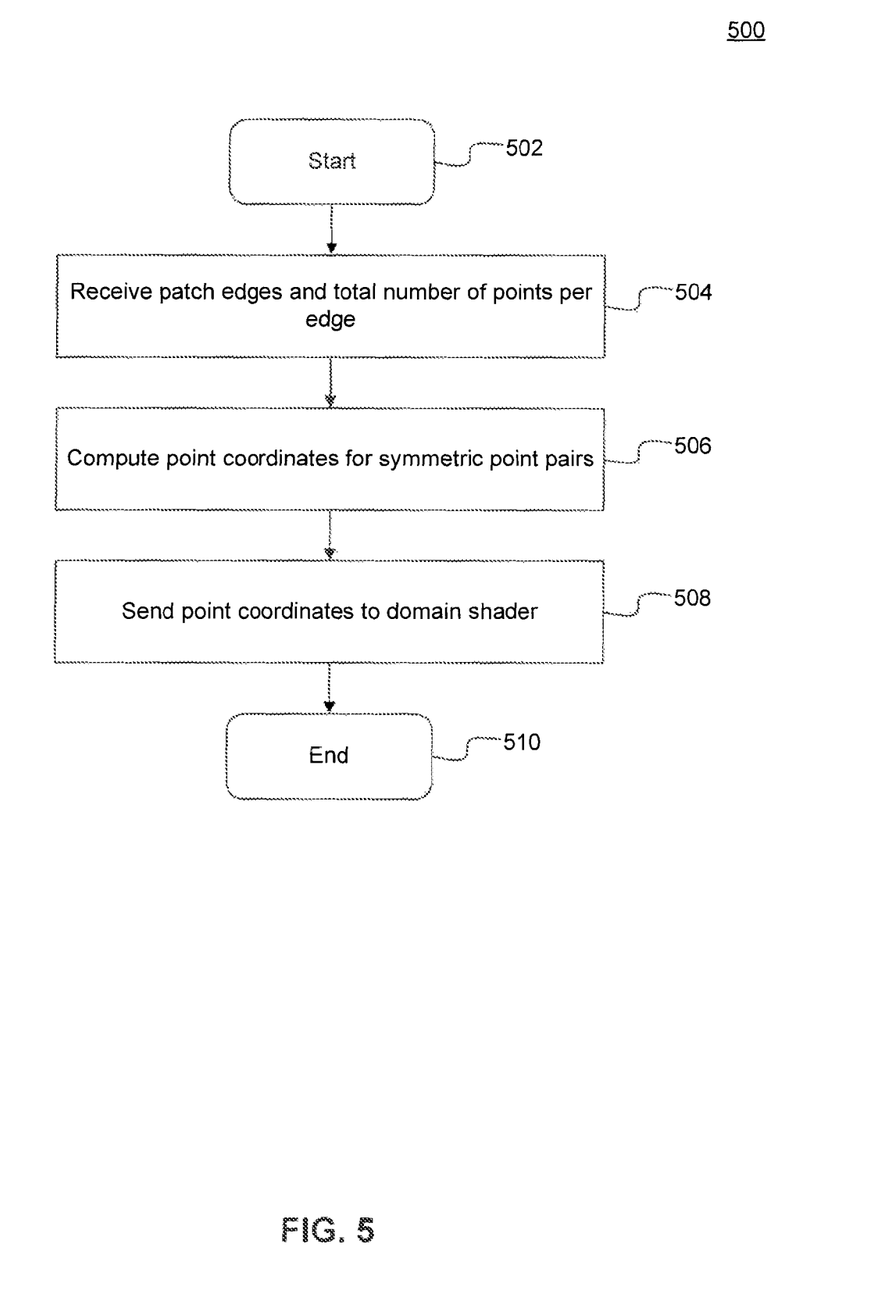
FIG. 5 is a flowchart illustrating steps by which outer edge shader computes point data, in accordance with an embodiment of the present invention.

FIG. 5 is a flowchart 500 illustrating steps by which outer edge shader 108 computes point data, in accordance with an embodiment of the present invention. The method begins at operation 502 and proceeds to operation 504 where the outer edge shader 108 receives patch edges and a total number of points per edge. At operation 506, point coordinates are computed for symmetric point pairs, and these are provided to domain shader 112 at operation 508 via the point buffer. The method then ends at operation 510.

As previously described, hull shader 104 provides outer edge shader 108 with a point pair number of the edge, the first index of the edge, and a base address for the output point, in accordance with an embodiment of the present invention.

Outer Edge Buffer:
edge 0: P0 P5 6 base: 0 patchID 0
edge 1: P5 P16 12 base: 5 patchID 0
edge 2: P16 P0 16 base: 16 patchID 0
. . .
Outer Edge Shader Wave (One Thread Per Symmetric Point Pair):
Thread 0: edge 0, point (0, 5) output: P0, P5
Thread 1: edge 0, point (1, 4) output: P1, P4
Thread 2: edge 0, point (2, 3) output: P2, P3
Thread 3: edge 1, point (5, 16) output: P5, P16
Thread 4: edge 1, point (6, 15) output: P6, P15
Thread 5: edge 1, point (7, 14) output: P7, P14
Thread 6: edge 1, point (8, 13) output: P8, P13
Thread 7: edge 1, point (9, 12) output: P9, P12
Thread 8: edge 1, point (10,11) output: P10, P11
Thread 9: edge 2, point (16, 0) output: P16, P0
Thread 10: edge 2, point (17,30) output: P17, P30

As shown above, data received by outer edge shader 108 for edge 0 reflects that it is defined by points P0 and P5, and that there are 6 points along that edge. Additionally, the first point begins at base 0 in the point buffer. Note that edge 1 begins at base 5, which corresponds to P5.

The edge shader computes, for each point pair, its (u,v) coordinate values, one edge per thread, in accordance with an embodiment of the present invention. These coordinate values are ready for provision to the domain shader in the point buffer.

Figure 6:
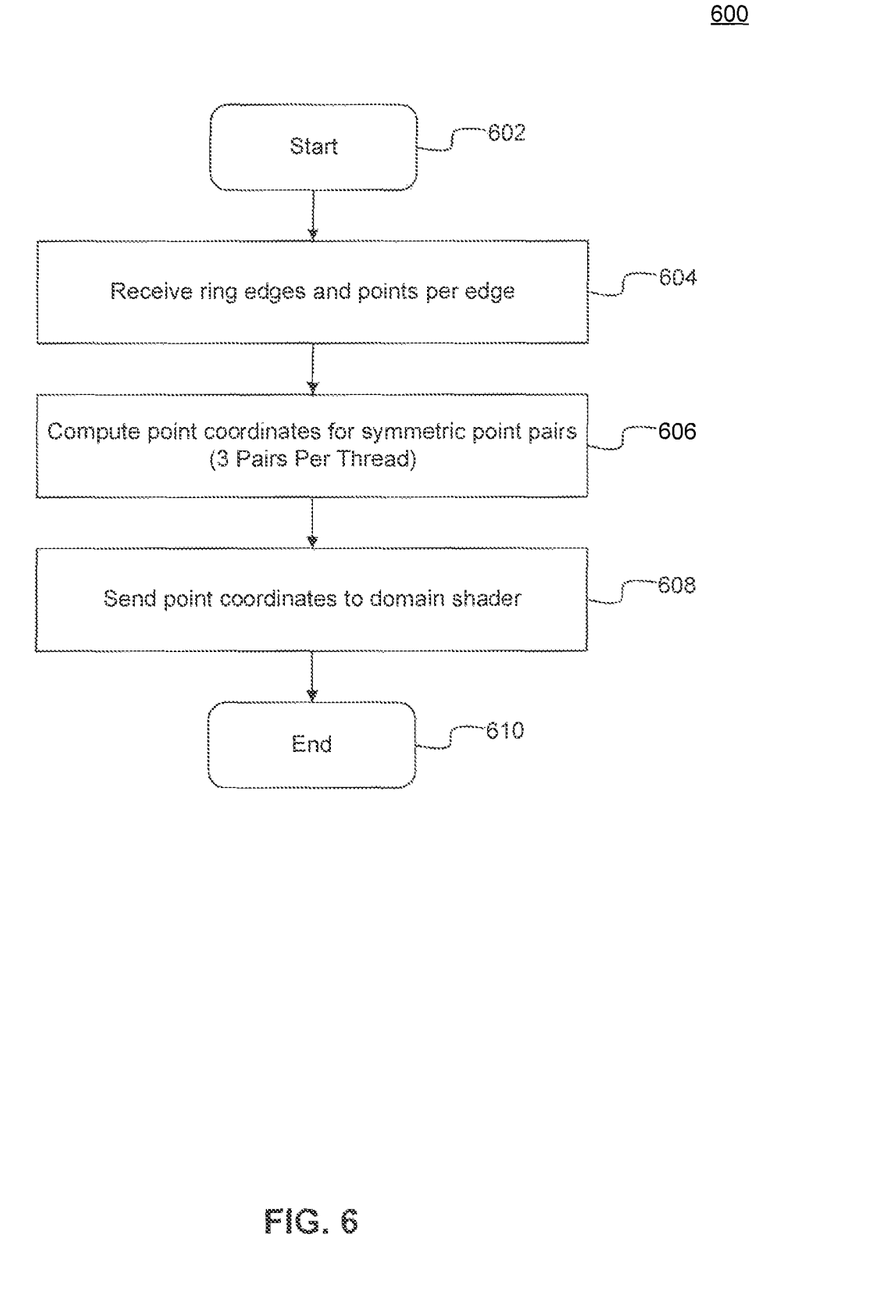
FIG. 6 is a flowchart illustrating steps by which inner ring shader computes point data, in accordance with an embodiment of the present invention.

The inner ring shader 106 also computes (u,v) coordinate values, like outer edge shader 108, but using a slightly different technique. FIG. 6 is a flowchart 600 illustrating steps by which inner ring shader 106 computes point data, in accordance with an embodiment of the present invention. The method begins at operation 602 and proceeds to operation 604 where the inner ring shader 106 receives ring edges and total points per edge. At operation 606, point coordinates are computed for symmetric point pairs (three pairs per thread, in a non-limiting example embodiment), and these are provided to domain shader 112 at operation 608 via the point buffer. The method then ends at operation 610.

As previously discussed, bull shader 104 provides inner ring shader 106 with a number of points per edge, the first index of the ring, and a base address for the output point, in accordance with an embodiment of the present invention.

Inner Ring Buffer:
ring 0: P31 4 base: 31 patchID 0
ring 1: P40 2 base: 40 patchID 0
...

Inner Ring Shader Wave (One Thread Per 3 Symmetric Point Pairs):
Thread 0: ring 0, point {(31,34) (34, 37), (37, 31)} output: P31, P34, P37 (edge end point repeated)
Thread 1: ring 0, point {(32,33) (35, 36), (38, 39)} output: P32, P33, P35, P36, P38, P39
Thread 2: ring 1, point {(40,41) (41, 42), (42, 40)} output: P40, P41, P42
...

As shown above, data shown for ring 0 (of patch 0) reflects that it is identified by point P31, and that each edge has 4 points (e.g., edge P31 to P34 has four points—P31, P32, P33, and P34). Note that points along an edge appear in index order, so the entire ring can be defined by a single control point and number of points per edge. In accordance with an embodiment of the present invention, the control point is the same as the first index of the ring.

In the aforementioned non-limiting example, each thread handles all of the symmetric point pairs for the edge (e.g., (31,34), (34,37), and (37,31)). The inner ring shader computes, for each point pair, its (u,v) coordinate values, in accordance with an embodiment of the present invention. These coordinate values are ready for provision to the domain shader in the point buffer.

As previously discussed, the final steps of the process are to translate the point data from the inner ring shader 106 and outer edge shader 108 from patch (u,v) coordinate values to vertex values as in operation 210 of FIG. 2. This is handled by domain shader 112, which receives data from the point buffer. Domain shader 112 provides this vertex data to geometry shader 114, which, along with the primitive data provided by topologic shader 110 in the primitive buffer, provides cohesive primitive data using both sets of information.

As will be recognized by one skilled in the relevant art, no modification to domain shader 112 and geometry shader 114 is necessary from existing shader configurations. The proposed new shaders and modification to hull shader 104 serve as a substitute for the tessellation engine currently in use, and are compatible with any such existing implementation (e.g., bypassing the tessellation engine).

Figure 7:
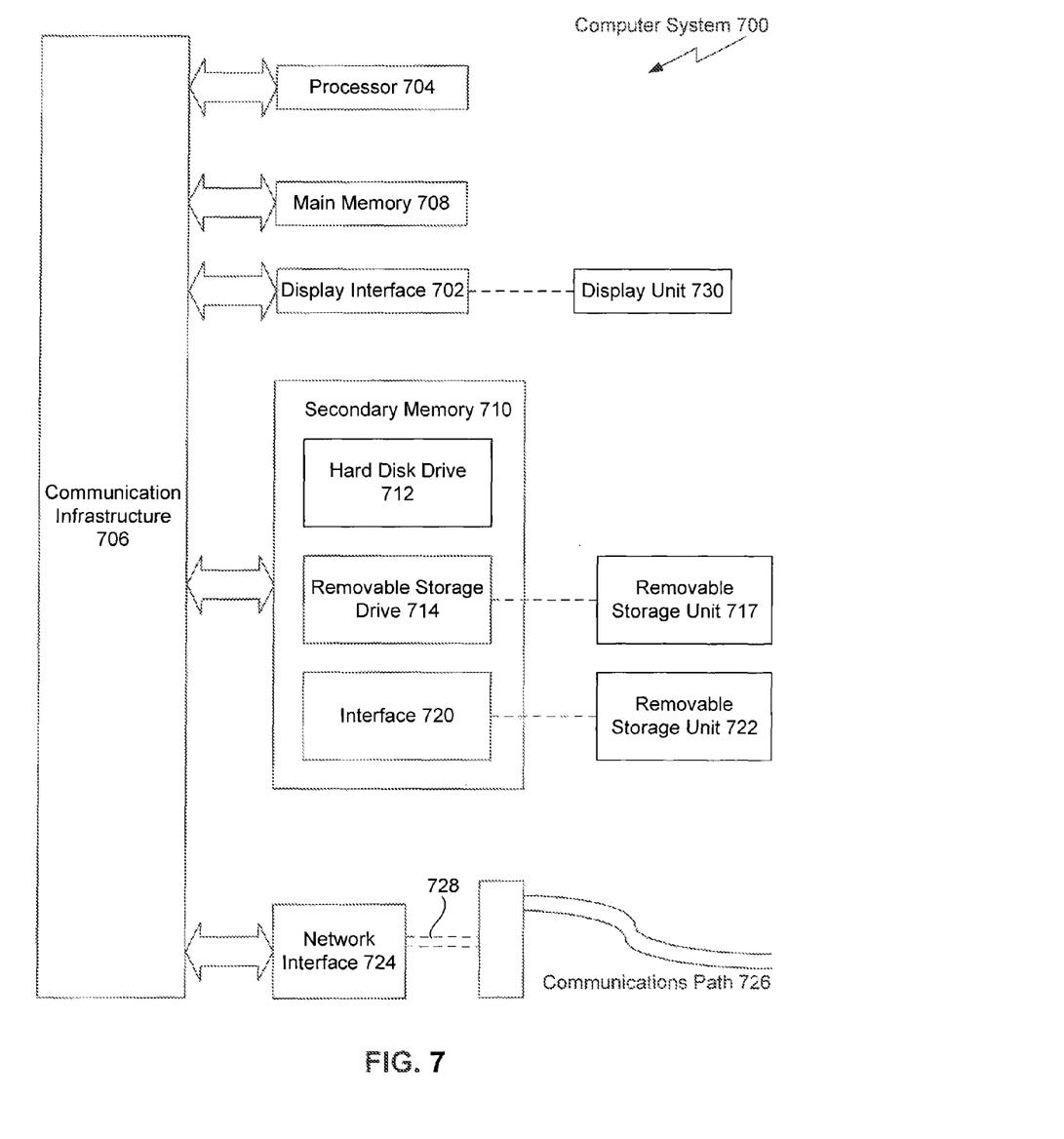
FIG. 7 depicts an example computer system in which embodiments of the present invention may be implemented.

Various aspects of the present invention can be implemented by software, firmware, hardware, or a combination thereof FIG. 7 illustrates an example computer system 700 in which the present invention, or portions thereof, can be implemented as computer-readable code. For example, the methods illustrated by flowcharts 200 of FIG. 2, 400 of FIG. 4, 500 of FIG. 5, and 600 of FIG. 6, can be implemented in system 700. Various embodiments of the invention are described in terms of this example computer system 700. After reading this description, it will become apparent to a person skilled in the relevant art how to implement the invention using other computer systems and/or computer architectures.

Computer system 700 includes one or more processors, such as processor 704. Processor 704 can be a special purpose or a general purpose processor. Processor 704 is connected to a communication infrastructure 706 (for example, a bus or network).

Computer system 700 also includes a main memory 708, preferably random access memory (RAM), and may also include a secondary memory 710. Secondary memory 710 may include, for example, a hard disk drive 712, a removable storage drive 714, and/or a memory stick. Removable storage drive 714 may comprise a floppy disk drive, a magnetic tape drive, an optical disk drive, a flash memory, or the like. The removable storage drive 714 reads from and/or writes to a removable storage unit 718 in a well known manner. Removable storage unit 718 may comprise a floppy disk, magnetic tape, optical disk, etc. that is read by and written to by removable storage drive 714. As will be appreciated by persons skilled in the relevant art(s), removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 that allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 are in the form of signals that may be electronic, electromagnetic, optical, or other signals capable of being received by communications interface 724. These signals are provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Signals carried over communications path 726 can also embody the logic described herein. Computer program medium and computer usable medium can also refer to memories, such as main memory 708 and secondary memory 710, which can be memory semiconductors (e.g. DRAMs, etc.). These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement the present invention as discussed herein, in particular, the computer programs, when executed, enable processor 704 to implement the processes of the present invention, such as the steps in the methods illustrated by flowcharts 200 of FIG. 2, 400 of FIG. 4, 500 of FIG. 5, and 600 of FIG. 6, discussed above. Accordingly, such computer programs represent controllers of the computer system 700. Where the invention is implemented using software, the software may be stored in a computer program product and loaded into computer system 700 using removable storage drive 714, interface 720, hard drive 712 or communications interface 724.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for use in a computing device to perform tessellation, the method comprising:
   processing a patch to identify an inner ring, an outer edge, and a stitch of the patch;
   computing tessellated point data using the inner ring and the outer edge, wherein the computing tessellated point data includes generating vertices for the computed tessellated point data;
   computing tessellated primitive data using the stitch of the patch, wherein the tessellated point data and the tessellated primitive data are computed in parallel; and
   combining the tessellated primitive data and vertices to produce tessellated primitives of the patch.

2. The method of claim 1, wherein identifying the inner ring comprises:
   computing a number of points per edge; and
   identifying an index point.

3. The method of claim 1, wherein identifying the outer edge comprises:
   computing a number of points per edge; and
   identifying a point pair.

4. The method of claim 1, wherein identifying the stitch comprises:
   identifying an index of an inner edge and an index of the outer edge;
   computing a number of points on the inner edge and a number of points on the outer edge; and
   computing a number of primitives in the stitch.

5. The method of claim 1, wherein computing point data using the inner ring and the outer edge comprises:
   computing a patch coordinate for each point in a symmetric point pair.

6. The method of claim 1, wherein computing the primitive data using the stitch comprises:
   identifying a first point using an index of an inner edge;
   identifying a second point using an index of the outer edge; and
   computing a third point as a subsequent index to the index of the inner edge or the index of the outer edge based on an orientation of a primitive.

7. The method of claim 6, further comprising:
   using the subsequent index and one of the index of the inner edge or the index of the outer edge as starting points of a subsequent primitive.

8. A non-transitory computer-readable storage device holding having instructions stored thereon, the execution of which by a connected computing device, causes the computing device to perform tessellation operations comprising:
   processing a patch to identify an inner ring, an outer edge, and a stitch of the patch;
   computing tessellated point data using the inner ring and the outer edge, wherein the computing tessellated point data includes generating vertices for the computed tessellated point data;
   computing tessellated primitive data using the stitch of the patch, wherein the tessellated point data and the tessellated primitive data are computed in parallel; and
   combining the tessellated primitive data and vertices to produce tessellated primitives of the patch.

9. The non-transitory computer-readable storage device of claim 8, wherein identifying the inner ring comprises:
   computing a number of points per edge; and
   identifying an index point.

10. The non-transitory computer-readable storage device of claim 8, wherein identifying the outer edge comprises:
    computing a number of points per edge; and
    identifying a point pair.

11. The non-transitory computer-readable storage device of claim 8, wherein identifying the stitch comprises:
    identifying an index of an inner edge and an index of the outer edge;
    computing a number of points on the inner edge and a number of points on the outer edge; and
    computing a number of primitives in the stitch.

12. The non-transitory computer-readable storage device of claim 8, wherein computing point data using the inner ring and the outer edge comprises:
    computing a patch coordinate for each point in a symmetric point pair.

13. The non-transitory computer-readable storage device of claim 8, wherein computing the primitive data using the stitch comprises:
    identifying a first point using an index of an inner edge;
    identifying a second point using an index of the outer edge; and
    computing a third point as a subsequent index to the index of the inner edge or the index of the outer edge based on an orientation of a primitive.

14. The non-transitory computer-readable storage device of claim 13, the operations further comprising:
    using the subsequent index and one of the index of the inner edge or the index of the outer edge as starting points of a subsequent primitive.

15. A system including a storage device holding instructions and a connected processor operating on the instructions to perform tessellation comprising:
    a hull shader configured to process a patch to identify an inner ring, an outer edge, and a stitch of the patch;
    one or more edge or ring shaders configured to compute tessellated point data using the inner ring and the outer edge, wherein the computing tessellated point data includes generating vertices for the computed tessellated point data;

a topologic shader configured to compute tessellated primitive data using the stitch of the patch, wherein the tessellated point data and the tessellated primitive data are computed in parallel; and one or more domain or geometry shaders configured to combine the tessellated primitive data and vertices to produce tessellated primitives of the patch.

16. The system of claim 15, wherein the hull shader is further configured to compute a number of points per edge and identify an index point.

17. The system of claim 15, wherein the hull shader is further configured to compute a number of points per edge and identify a point pair.

18. The system of claim 15, wherein the hull shader is further configured to identify an index of an inner edge and an index of the outer edge, compute a number of points on the inner edge and a number of points on the outer edge, and compute a number of primitives in the stitch.

19. The system of claim 15, wherein the one or more edge or ring shaders are further configured to compute a patch coordinate for each point in a symmetric point pair.

20. The system of claim 15, wherein the topologic shader is further configured to identify a first point using an index of an inner edge, identify a second point using an index of the outer edge, and compute a third point as a subsequent index to the index of the inner edge or the index of the outer edge based on an orientation of a primitive.

21. The system of claim 20, wherein the topologic shader is further configured to use the subsequent index and one of the index of the inner edge or the index of the outer edge as starting points of a subsequent primitive.

* * * * *